United States Patent [19]

Konuma

[11] Patent Number: 5,164,852
[45] Date of Patent: Nov. 17, 1992

[54] METHOD OF ORIENTATING A FERROELECTRIC LIQUID CRYSTAL LAYER BY AC ELECTRIC FIELD

[75] Inventor: Toshimitsu Konuma, Atsugi, Japan

[73] Assignee: Semiconductor Energy Laboratory Co., Ltd., Atsugi, Japan

[21] Appl. No.: 866,310

[22] Filed: Apr. 13, 1992

Related U.S. Application Data

[63] Continuation of Ser. No. 532,365, Jun. 4, 1990, abandoned, which is a continuation of Ser. No. 133,353, Dec. 15, 1987, abandoned.

[30] Foreign Application Priority Data

Dec. 16, 1986 [JP] Japan ................................. 61-299279

[51] Int. Cl.⁵ ........................................... G02F 1/133
[52] U.S. Cl. ...................... 359/76; 359/78; 359/90; 359/100
[58] Field of Search ............... 350/350 S, 341; 359/56, 359/36, 75, 76, 78, 90, 100, 84

[56] References Cited

U.S. PATENT DOCUMENTS

| | | | |
|---|---|---|---|
| 4,367,924 | 1/1983 | Clark et al. | 350/350 S |
| 4,586,791 | 5/1986 | Isogai et al. | 350/350 S |
| 4,668,051 | 5/1987 | Mourey et al. | 350/350 S |
| 4,778,259 | 10/1988 | Kitayama et al. | 350/350 S |
| 4,781,441 | 11/1988 | Kanbe et al. | 350/350 S |
| 4,790,631 | 12/1988 | Yamazaki | 350/350 S |
| 4,867,539 | 9/1989 | Goodby et al. | 350/350 S |
| 5,013,137 | 5/1991 | Tsuboyama et al. | 350/350 S |

FOREIGN PATENT DOCUMENTS

| | | | |
|---|---|---|---|
| 0219479 | 4/1987 | European Pat. Off. | |
| 0179721 | 9/1985 | Japan | 350/350 S |
| 1269124 | 11/1986 | Japan | 350/350 S |
| 2183054 | 5/1987 | United Kingdom | 350/350 S |

OTHER PUBLICATIONS

Patel et al., "A Reliable Method of Alignment for Smectic Liquid Crystals" Ferroelectrics 1984.

*Primary Examiner*—Janice A. Howell
*Assistant Examiner*—Tai V. Duong
*Attorney, Agent, or Firm*—Sixbey, Friedman, Leedom & Ferguson

[57] ABSTRACT

A liquid crystal layer interposed between a pair of glass substrates is re-oriented for the purpose of eliminating zig-zag dislocations and providing a clear threshold voltage. First, the liquid crystal layer is transformed by elevating the temperature into an isotropic phase which affords a low viscosity, and then applied with an alternating electric field in order to urge the liquid crystal layer to be oriented in a direction parallel with the substrates. Next, the liquid crystal layer is gradually cooled to room temperature while the electric field application continues.

9 Claims, 2 Drawing Sheets

METHOD OF ORIENTATING A FERROELECTRIC LIQUID CRYSTAL LAYER BY AC ELECTRIC FIELD

This application is a continuation of Ser. No. 07/532,365, filed Jun. 4, 1990, now abandoned, which itself was a continuation of Ser. No. 07/133,353, filed Dec. 15, 1987, abandoned.

BACKGROUND OF THE INVENTION

This invention relates to a liquid crystal layer alignment (orientation) method, and more particularly, to a method for obtaining a defectless aligned layer of a liquid crystal medium for liquid crystal device such as displays.

Great interest has focused recently to displays, memories or the like embodying ferroelectric liquid crystal mediums, which afford high device performances such as a quick response, an excellent property as a memory medium.

However, since the tendency to be crystallographically aligned is very strong in a ferroelectric liquid crystal, e.g., of smectic C*, smectic H* or the like as compared with such as in a nematic liquid crystal, creation of defects in an aligned liquid crystal is likely when prepared only by a horizontal alignment treatment, resulting in making some pixels unstable and the contrast low. Accordingly, It is necessary to produce stable domains in a ferroelectric liquid crystal layer to devise reliable display and memory.

For orientating a ferroelectric liquid crystal, there are known temperature gradiating methods making use of a spacer edge, a magnetic alignment methods, shearing methods, inclined deposition methods, rubbing methods and so forth. While each method has its advantage and its shortcoming, rubbing methods, which have been broadly used in production of TN liquid crystal devices, seem suitable for mass-production. In accordance with thus method, a uniform organic or inorganic film is formed on an inside surface of a substrate, and rubbed with a cloth in one direction, on which the director of liquid crytal molecules are aligned in the direction.

However, when aligned by a rubbing method, some defects may occur in the liquid crystal, i.e., zig-zag dislocations, making the vicinity unstable. The defects have been found as causes to make unclear the threshold voltage with respect to the response of the liquid crystal and to degrade the contrast of the liquid crystal device.

SUMMARY OF THE INVENTION

It is therefore an object of the invention to align a ferroelecctric liquid crystal layer without dislocation.

It is another object of the invention to provide a well-aligned liquid crystal layer which is endowed with a clear threshold voltage.

BRIEF DESCRIPTION OF THE INVENTION

DETAILED DESCRIPTION OF THE PREFERRED EMBODIMENTS

In advance of describing in detail an embodiment of the present invention, the principle of the method is illustrated.

In case of a liquid crystal having a negative dielectric anisotropy, when an electric field E is impressed to a liquid crystal, the energy density W attributed to the director n which designates the direction of the long axes of the liquid crystal molecules, in virtue of the dielectric anisotropy of the liquid crystal dD, is expressed by the following equation (1);

$$W = -\tfrac{1}{2} dD(nE)^2 \qquad (1)$$

Because Dd<0, the energy density becomes minimum when the director is perpendicular to the electric field, i.e., parallel to the plane of a pair of substrates between which a liquid crystal layer is interposed. When applied with an alternating electric field, the spontaneous dipole moment of the ferroelectric liquid crystal can not follow the highly alternating electric field induced by the alternating electric field and apparently vanished by balancing so that the liquid crystal is subjected only to the torque produced by the dielectric anisotropy and aligned in a direction perpendicular to the electric field. Although the effective frequency of the electric field depends on the liquid crystal, most of liquid crystals fail to follow the electric field at no lower than 3 KHz with respect of torque produced by the spontaneous dipoles. If the frequency becomes higher than 50 KHz, then the liquid crystal come to fail to follow the input electric field also with respect to torque produced by the dielectric anisotropy.

Likewise, the suitable magnitude of the applied voltage depends on the liquid crystal. While little effect can be expected with a voltage lower than 10 V, the layered structure of the liquid crystal may be broken when applied with a voltage higher than 80 V.

Figure 1:
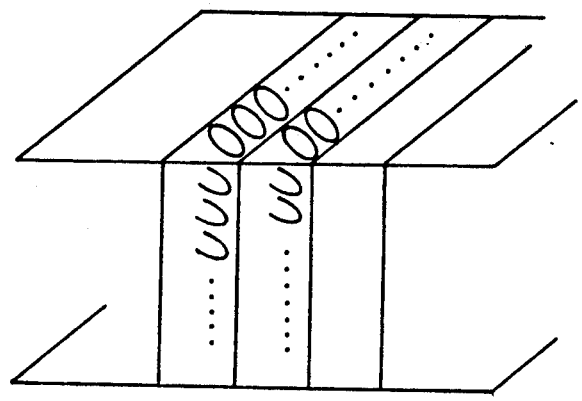
FIG. 1 is an explanatory view showing well aligned molecular layers of the liquid crystal being applied with an alternating electric field.
Figure 2:
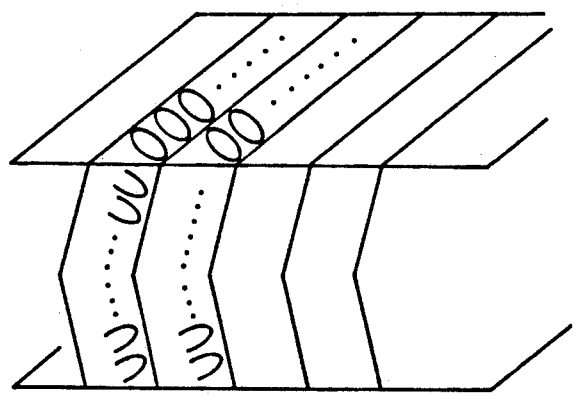
FIG. 2 is an explanatory view showing distorted molecular layers of a liquid crystal prior to being treated by an orientating method in accordance with the present invention.

FIG. 2 shows a liquid crystal layer with a number of molecular layers normal thereto without treatment according to the invention. Some molecular layers are bent and have series of molecules which are not parallel to the substrate. The alternating electric field normal to the substrate acts on the liquid crystal molecules and forces the same to direct to the direction in parallel with the substrate so that the energy of the system takes minimum. In FIG. 1 is illustrated a liquid crystal layer, after the treatment in accordance with the invention, in which all the molecules are directed in parallel with the substrate constituting well aligned molecular layers normal to the substrate.

When the applied electric field is removed from the liquid crystal layers being of isotropic, layer distortions appear again. However, the number of the defects including the layer distortions is decreased as compared with those prior to the treatment. If the liquid crystal is transformed from an isotropic phase to a smectic chiral C phase with the well-aligned layers being applied with an alternating electric field, the liquid crystal layers in the smectic phase shall not return to the distorted condition again.

Figure 3:
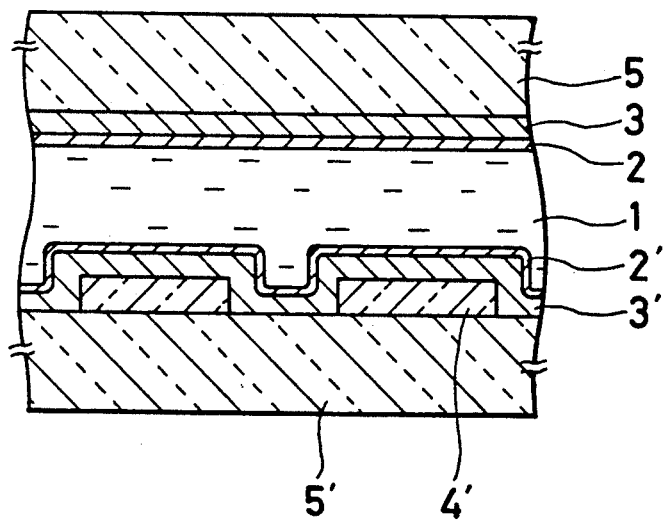
FIG. 3 is a partial cross sectional view showing a liquid crystal device produced in accordance with the present invention.

Referring to FIG. 3, a liquid crystal display according to the present invention is illustrated. In the figure, a pair of glass substrates 5 and 5' carry row and colomn electrode strips 3 and 3' on their insides surface in order to coordinate a matrix-addressed pixels. A space between the substrates 5 and 5' is filled with a ferroelectric liquid crystal medium (of a chiral semectic liquid crystal such as CS-1011 distributed from Petrarch Systems Inc.). Opposite inside surfaces in contact with the liquid crystal layer 1 are coated with an organic insulating film of 6-nylon which are given rubbing treatment by a cotton cloth to produce orientation control surfaces. The filling of the liquid crystal is carried out at 91° C. or higher with a liquid crystal being an isotropic phase. The liquid crystal layer is 2 microns thick. In this condition, there are observed many zig-zag dislocations.

To eliminate the dislocations, the liquid crystal layer is heated to 120° C. and becomes isotropic, and left to cool in atmosphere at room temperature by its self while the application of a high frequency electric power of ±20 V at 10 KHz continues. By this treatment, the zig zag dislocations disappear, and thereafter no dislocation appears anew.

While a description has been made for several embodiments, the present invention should be limited only by the appended claims and should not be limited by the particualr examples.

I claim:

1. A method of orientating a ferroelectric liquid crystal layer having a negative dielectric anisotropy comprising:
   interposing said liquid crystal layer between a pair of substrates;
   applying to said liquid crystal layer a continuously varying alternating current electric field substantially perpendicular to said substrates at an elevated temperature at which said liquid crystal layer is an isotropic phase; and
   continuing said application of electric field while the temperature of said liquid crystal layer is gradually decreased to change the phase of said liquid crystal layer from said isotropic phase to a chiral smectic C phase in which said liquid crystal layer possesses ferroelectric properties,
   wherein the frequency of said alternating current electric field is no lower than 3 KHz in order not to cause substantial torque produced by the spontaneous dipole moment of the liquid crystal layer.

2. The method of claim 1 wherein said alternating current electric field is applied to opposed electrodes formed on the opposed inside surfaces of said substrates.

3. The method of claim 1 wherein the frequency of said alternating electric field is between 3 kilo and 50 kilo Hz.

4. The method of claim 1 wherein said substrates are provided with an orientation control surface on at least one inside surface of the substrates.

5. The method of claim 4 wherein said orientation control surface is provided by coating the inside surface with an organic or inorganic film and giving the surface a rubbing treatment.

6. The method of claim 1 wherein said alternating electric field is applied perpendicularly to said substrates.

7. The method of claim 6 wherein the magnitude of said field is between 10 V/cm and 80 V/cm.

8. The method of claim 1 wherein said liquid crystal exhibits a chiral smectic C phase at room temperature.

9. The method of claim 1 where said electric field is only substantially perpendicular to the substrates.

* * * * *